United States Patent
Mibu et al.

(10) Patent No.: US 10,982,697 B2
(45) Date of Patent: Apr. 20, 2021

(54) HYDRAULIC DRIVE UNIT

(71) Applicant: KAWASAKI JUKOGYO KABUSHIKI KAISHA, Kobe (JP)

(72) Inventors: Koki Mibu, Akashi (JP); Akihiro Kondo, Kobe (JP); Akihito Suzuki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/641,683

(22) PCT Filed: Aug. 8, 2018

(86) PCT No.: PCT/JP2018/029753
§ 371 (c)(1),
(2) Date: Feb. 25, 2020

(87) PCT Pub. No.: WO2019/039286
PCT Pub. Date: Feb. 28, 2019

(65) Prior Publication Data
US 2020/0217334 A1    Jul. 9, 2020

(30) Foreign Application Priority Data
Aug. 25, 2017 (JP) .............................. JP2017-162232

(51) Int. Cl.
*F15B 21/044* (2019.01)
*F15B 1/26* (2006.01)
*F16H 61/4174* (2010.01)

(52) U.S. Cl.
CPC ............ *F15B 21/044* (2013.01); *F15B 1/265* (2013.01); *F16H 61/4174* (2013.01)

(58) Field of Classification Search
CPC ..... F15B 1/265; F15B 21/044; F16H 61/4174
See application file for complete search history.

(56) References Cited

U.S. PATENT DOCUMENTS

| | | | | |
|---|---|---|---|---|
| 2,861,550 | A * | 11/1958 | Hanna | F15B 13/0438 137/596.15 |
| 4,052,852 | A * | 10/1977 | Hart | F15B 1/265 60/478 |
| 4,064,911 | A * | 12/1977 | Albrecht | F15B 1/103 138/30 |
| 4,696,684 | A * | 9/1987 | Shen | B01D 19/0063 95/266 |
| 5,775,103 | A * | 7/1998 | Ingvast | F15B 21/044 60/453 |
| 2004/0006981 | A1* | 1/2004 | Dong | F16H 61/461 60/464 |

(Continued)

FOREIGN PATENT DOCUMENTS

JP     H07-2606 U    1/1995

*Primary Examiner* — Abiy Teka
*Assistant Examiner* — Matthew Wiblin
(74) *Attorney, Agent, or Firm* — Oliff PLC

(57) ABSTRACT

A hydraulic drive unit includes: a pump; a pair of supply-discharge lines; a valve block; a sealed tank; a suction line that leads hydraulic oil in the sealed tank to the pump; a connecting line that connects an air vent port of the pump to the suction line; and a gas-liquid separator that separates air and the hydraulic oil flowing through the connecting line from each other. The pump is disposed upward of the valve block and the sealed tank in a vertical direction.

2 Claims, 4 Drawing Sheets

(56) References Cited

U.S. PATENT DOCUMENTS

| | | | |
|---|---|---|---|
| 2008/0271445 A1* | 11/2008 | Bair | F15B 21/044 |
| | | | 60/546 |
| 2015/0247511 A1* | 9/2015 | Barr | B60T 17/06 |
| | | | 60/327 |
| 2016/0102685 A1* | 4/2016 | Chester | F15B 7/006 |
| | | | 60/327 |
| 2016/0138624 A1* | 5/2016 | Oftelie | F15B 19/005 |
| | | | 701/50 |
| 2017/0114805 A1* | 4/2017 | Lerner | F15B 15/17 |

* cited by examiner

HYDRAULIC DRIVE UNIT

TECHNICAL FIELD

The present invention relates to a closed-circuit type hydraulic drive unit that drives a hydraulic actuator including a pair of supply-discharge ports.

BACKGROUND ART

There are cases where a drive unit for driving a hydraulic actuator including a pair of supply-discharge ports, such as a double-acting hydraulic cylinder or a hydraulic motor, is configured as a "closed circuit". It should be noted that the closed circuit herein refers to a circuit in which return oil from the hydraulic actuator is returned to a pump, whereas an "open circuit" refers to a circuit in which the return oil is returned to a tank.

In the closed circuit, the pump includes a pair of pump ports, and the pair of pump ports is connected to the pair of supply-discharge ports via a pair of supply-discharge lines. In accordance with the rotation direction of the pump, the delivery side and the suction side of the pump ports are switched with each other, and also, the supply side and the discharge side of the supply-discharge ports are switched with each other, and thereby the moving direction of the hydraulic actuator is changed. Usually, the closed circuit is also provided with a tank for storing hydraulic oil, and the tank is used for collecting a surplus amount of the hydraulic oil delivered from the pump and replenishing the suction side of the pump with the hydraulic oil.

In Patent Literature 1, the supply-discharge lines are provided with direction switching valves for removing air accumulated in the closed circuit. The direction switching valves switch the state of the supply-discharge ports between a state where the supply-discharge ports are connected to the pump ports and a state where the supply-discharge ports are connected to the tank. The closed circuit is provided with passages that form an open circuit via the direction switching valves so that the air in the closed circuit can be caused to flow out of the closed circuit into the tank together with the return oil.

CITATION LIST

Patent Literature

PTL 1: Japanese Laid-Open Utility Model Application Publication No. H07-2606

SUMMARY OF INVENTION

Technical Problem

However, in Patent Literature 1, since both the closed circuit and the open circuit exist inside the unit, the unit has a complex configuration. In some other known techniques, the tank is configured as a sealed tank. However, in such a case where the tank is configured as a sealed tank, if the air is caused to flow out of the closed circuit into the tank, the air is accumulated in the tank. The technique disclosed by Patent Literature 1 assumes that the air is released from the tank, and Patent Literature 1 does not disclose how to deal with accumulated air in the tank.

In view of the above, an object of the present invention is to provide a closed-circuit type hydraulic drive unit that uses a sealed tank and is capable of readily removing air from the inside of the unit.

Solution to Problem

A hydraulic drive unit according to one aspect of the present invention is a hydraulic drive unit for driving a hydraulic actuator including a pair of supply-discharge ports. The hydraulic drive unit includes: a pump including a casing, a pair of pump ports, and an air vent port from which air in the casing is discharged to an outside of the casing together with hydraulic oil; a pair of supply-discharge lines that connects between the pair of pump ports and the pair of supply-discharge ports; a valve block that incorporates at least one valve therein, the at least one valve being provided on the pair of supply-discharge lines and/or oil passages connected to the pair of supply-discharge lines; a sealed tank that is connected to the pair of supply-discharge lines, the sealed tank storing the hydraulic oil; a suction line that leads the hydraulic oil in the sealed tank to the pump; a connecting line that connects the air vent port to the suction line; and a gas-liquid separator that separates air and the hydraulic oil flowing through the connecting line from each other, the gas-liquid separator supplying the separated hydraulic oil to the suction line while releasing the separated air from the connecting line. The pump is disposed upward of the valve block and the sealed tank in a vertical direction.

According to the above configuration, even if air enters the sealed tank, the air can be collected, via the suction line and the valve block, in the casing of the pump, which is disposed upward of the sealed tank and the valve block. The air collected in the casing passes through the air vent port together with the hydraulic oil, and is led toward the suction line. The air is separated from the hydraulic oil by the gas-liquid separator, and is released to the outside. A flow directed to the suction side of the pump ports tends to occur in the suction line. Accordingly, a flow from the air vent port to the suction line also tends to occur, which facilitates discharging of the air from the casing. For these reasons, the air can be readily removed from the inside of the unit The hydraulic drive unit may further include: a frame to which the pump and the valve block are mounted; and a tank support mechanism that supports a bottom portion of the sealed tank from below. The sealed tank may be disposed such that a hydraulic oil inlet/outlet of the sealed tank faces upward, and such that the sealed tank is mountable to and detachable from the frame without disassembling a framework of the frame. The tank support mechanism may include: a fixing member fixed to the frame; and a movable member that is movable in an upward and downward direction relative to the fixing member. An upper end portion of the movable member may contact the bottom portion of the sealed tank from below.

When performing maintenance work on the sealed tank, detaching the sealed tank from the unit and re-mounting the sealed tank to the unit may be necessary in some cases. In such a case, according to the above configuration, since the sealed tank is disposed such that the sealed tank is mountable to and detachable from the frame without disassembling the framework of the frame, the work of mounting and detaching the sealed tank can be readily performed, and consequently, maintenance work on the sealed tank can be readily performed. In the sealed tank mounting work, by adjusting the position of the movable member in the upward and downward direction relative to the fixing member, the position of the sealed tank in the upward and downward direction is adjustable relative to the frame as well as the valve block and the pump mounted to the frame. That is, the tank support mechanism has a height adjustment function of adjusting the height of the tank. This makes it possible to suppress the application of an excessive stress to the piping connected to the sealed tank. Consequently, the durability of the unit is improved.

The sealed tank may be a pressure-sealed tank. The bottom portion of the sealed tank may be provided with a gas pressure adjusting port for adjusting an internal gas pressure of the sealed tank. The upper end portion of the movable member may include a tubular member that surrounds the gas pressure adjusting port, the tubular member contacting the bottom portion of the sealed tank. The tubular member may be made of a material having a lower hardness than that of the sealed tank.

According to the above configuration, the gas pressure adjusting port can be protected from the outside by the tubular member. The tubular member, which receives the load of the sealed tank, is made of a material having a lower hardness than that of the sealed tank. This makes it possible to prevent the sealed tank, including the gas pressure adjusting port, from being damaged by the tubular member.

Advantageous Effects of Invention

The present invention makes it possible to provide a closed-circuit type hydraulic drive unit that uses a sealed tank and is capable of readily removing air from the inside of the unit.

DESCRIPTION OF EMBODIMENTS

Figure 1:
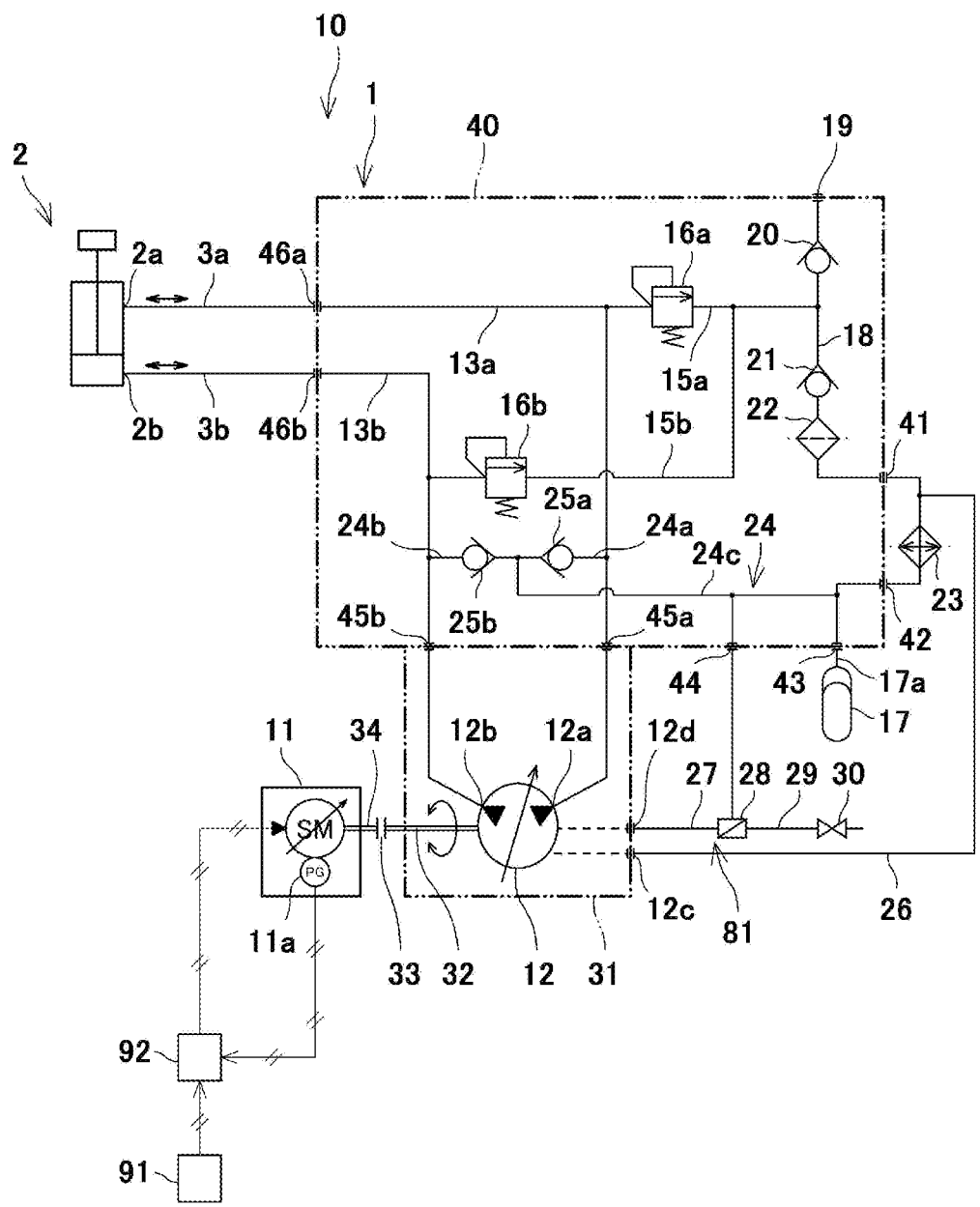
FIG. 1 is a circuit diagram of a hydraulic drive system according to an embodiment.

Hereinafter, an embodiment is described with reference to the drawings. In the drawings, the same or corresponding elements are denoted by the same reference signs, and repeating the same detailed descriptions is avoided below.

(Circuit)

FIG. 1 is a circuit diagram of a hydraulic drive system 10 according to the embodiment. The hydraulic drive system 10 includes a hydraulic drive unit 1, which drives a hydraulic actuator 2. The hydraulic drive system 10 is installed, for example, in an industrial machine such as a hydraulic press or test equipment.

The hydraulic actuator 2 includes a pair of supply-discharge ports 2a and 2b. The supply side and the discharge side of the pair of supply-discharge ports 2a and 2b are switched with each other in accordance with the moving direction of the hydraulic actuator 2. Supply-discharge piping members (e.g., rubber hoses) 3a and 3b, which constitute a part of a pair of supply-discharge lines 13a and 13b, are connected to the supply-discharge ports 2a and 2b. The pair of supply-discharge lines 13a and 13b will be described below. The hydraulic actuator 2 may be configured as a double-acting single-rod hydraulic cylinder as shown in the drawing. Alternatively, the hydraulic actuator 2 may be configured as a double-acting double-rod hydraulic cylinder, or may be configured as a hydraulic motor. In a case where the hydraulic actuator 2 is configured as a hydraulic cylinder, the rod moving direction of the hydraulic cylinder (i.e., the moving direction of the hydraulic actuator 2) is changed by switching the supply side and the discharge side with each other. In a case where the hydraulic actuator 2 is configured as a hydraulic motor, the rotation direction of the hydraulic motor (i.e., the moving direction of the hydraulic actuator 2) is changed by switching the supply side and the discharge side with each other.

The hydraulic drive unit 1 includes an electric motor 11, a pump 12, a part of the pair of supply-discharge lines 13a and 13b, a sealed tank 17, a suction line 24, and a connecting line 27.

The electric motor 11 is rotatable in forward and reverse directions. The rotation direction and the rotation speed of the electric motor 11 are controlled by a controller 91. The controller 91 includes a CPU and memories such as a ROM and RAM. As a result of the CPU executing a program stored in the ROM, command values of the rotation direction and the rotation speed are derived and outputted. The electric motor 11 is driven by a motor driver 92 (e.g., a servo driver or an inverter), which operates in accordance with the command values outputted from the controller. The electric motor 11 is provided with a pulse generator 11a. Feedback control using a signal outputted from the pulse generator 11a is applied to the control of driving the electric motor 11.

As one example, the pump 12 is a variable displacement swash plate pump of a bidirectional rotation type. The pump 12 includes a pair of pump ports 12a and 12b. The pair of pump ports 12a and 12b is configured such that the delivery side and the suction side of the pump ports 12a and 12b are switchable with each other in accordance with the rotation direction of the electric motor 11. The first pump port 12a is connected to the first supply-discharge port 2a of the hydraulic actuator 2 via the first supply-discharge line 13a. The second pump port 12b is connected to the second supply-discharge port 2b of the hydraulic actuator 2 via the second supply-discharge line 13b.

Alternatively, the pump 12 may be a bent axis pump. Further alternatively, the pump 12 may be an over-center pump configured such that the delivery side and the suction side of the pump ports 12a and 12b are switchable with each other by tilting the swash plate or the bent axis over the center to one side or the other side, even though the rotation direction remains the same direction. In this case, instead of the electric motor 11, an engine may serve as the driving source of the pump 12.

The first supply-discharge line 13a is constituted by the aforementioned supply-discharge piping member 3a and an internal passage 40a formed inside a valve block 40. The second supply-discharge line 13b is constituted by the aforementioned supply-discharge piping member 3b and an internal passage 40b formed inside the valve block 40. The internal passages 40a and 40b are connected to actuator-side supply-discharge ports 46a and 46b provided at the surface of the valve block 40, and end portions of the supply-discharge piping members 3a and 3b are connected to the ports 46a and 46b, respectively. In this manner, the pair of supply-discharge lines 13a and 13b is configured. In the description hereinafter, the term "supply-discharge lines 13a and 13b" refers to the internal passages 40a and 40b included in the hydraulic drive unit 1, unless otherwise specified.

In accordance with the rotation direction of the electric motor 11, the delivery side and the suction side of the pump ports 12a and 12b are switched with each other, and in accordance therewith, the supply side and the discharge side of the supply-discharge ports 2a and 2b of the hydraulic actuator 2 are switched with each other.

A first relief passage 15a is branched off from the first supply-discharge line 13a, and a first relief valve 16a is provided on the first relief passage 15a. A second relief passage 15b is branched off from the second supply-discharge line 13b, and a second relief valve 16b is provided on the second relief passage 15b. The first relief passage 15a and the second relief passage 15b are connected to a tank line 18, which extends from an oil inlet/outlet 17a of the sealed tank 17.

The supply-discharge lines 13a and 13b are connected to the sealed tank 17 via the corresponding relief passages 15a and 15b (and the relief valves 16a and 16b provided thereon) and the tank line 18. It should be noted that an end portion of the tank line 18 is provided with an oil supply port 19. The sealed tank 17 can be replenished with hydraulic oil by pouring the hydraulic oil from the outside of the unit 1 through the oil supply port 19.

A check valve 20, a check valve 21, an oil filter 22, and an oil cooler 23 are arranged on the tank line 18 in this order in a direction from the oil supply port 19 toward the sealed tank 17. A connection point at which the tank line 18 and the relief passages 15a and 15b are connected to each other is positioned between the check valves 20 and 21 on the tank line 18. The check valve 20 prevents such a reverse flow that the hydraulic oil flowing into the tank line 18 from the relief passages 15a and 15b flows reversely toward the oil supply port 19. The check valve 21 prevents such a reverse flow that the hydraulic oil flowing out of the sealed tank 17 flows reversely toward the oil supply port 19. In other words, the check valve 21 guides the hydraulic oil flowing out of the sealed tank 17 toward the suction line 24.

The suction line 24 connects the sealed tank 17 to the first supply-discharge line 13a and the second supply-discharge line 13b, and leads the hydraulic oil in the sealed tank 17 to the pump 12. In this example, the suction line 24 includes: a single-line shared portion 24c, which is branched off from the tank line 18; and a first branched portion 24a and a second branched portion 24b, which are branched off from the shared portion 24c. A connection point at which the line 18 and the line 24 are connected to each other is positioned between the oil cooler 23 and the oil inlet/outlet 17a on the tank line 18. The first branched portion 24a is connected to the first supply-discharge line 13a, and the second branched portion 24b is connected to the second supply-discharge line 13b. The first branched portion 24a and the second branched portion 24b are provided with a check valve 25a and a check valve 25b, respectively. The check valves 25a and 25b prevent the hydraulic oil flowing through the supply-discharge lines 13a and 13b from flowing into the suction line 24. It should be noted that a connection point at which the first supply-discharge line 13a and the first branched portion 24a are connected to each other, and a connection point at which the first supply-discharge line 13a and the first relief passage 15a are connected to each other, are arranged on the first supply-discharge line 13a in this order in a direction from the first pump port 12a toward the first supply-discharge port 2a. Connection points are also arranged on the second supply-discharge line 13b in the same manner.

In addition to the pair of pump ports 12a and 12b, the pump 12 includes: a drain port 12c, from which surplus oil in the pump 12 is released; and an air vent port 12d, from which air accumulated in the pump 12 is discharged together with the hydraulic oil. The drain port 12c is connected to the tank line 18 via a pump drain line 26. A connection point at which the lines 18 and 26 are connected to each other is positioned between the oil filter 22 and the oil cooler 23 on the tank line 18.

The air vent port 12d is connected to the suction line 24 (in this example, the shared portion 24c of the suction line 24) via the connecting line 27. A gas-liquid separator 28 is interposed in the connecting line 27. An air passage 29, which is open to the outside of the unit 1 (e.g., open to the atmosphere), is connected to the gas-liquid separator 28. The air passage 29 is provided with an air vent valve 30, which opens and closes the air passage 29. The gas-liquid separator 28 separates the air and the hydraulic oil flowing through the connecting line 27 from each other, and supplies the separated hydraulic oil to the suction line 24 while releasing the separated air to the outside of the connecting line 27. The air is led from the gas-liquid separator 28 to the air passage 29, and released to the outside of the unit 1 when the air vent valve 30 is opened.

In the hydraulic drive unit 1 with the above-described circuit configuration, when the electric motor 11 rotates in one direction, the first pump port 12a acts as a delivery port, and the second pump port 12b acts as a suction port. The first supply-discharge line 13a acts as a supply line through which the pressure oil delivered from the delivery port flows. The first supply-discharge port 2a acts as a supply port to which the pressure oil is supplied. The second supply-discharge port 2b acts as a discharge port from which the return oil is discharged. The second supply-discharge line 13b acts as a discharge line through which the return oil flows. The return oil is returned to the second pump port 12b acting as a suction port. On the other hand, when the electric motor 11 rotates in the reverse direction, the first pump port 12a acts as a suction port, and the second pump port 12b acts as a delivery port. The first supply-discharge line 13a acts as a discharge line, and the second supply-discharge line 13b acts as a supply line. The first supply-discharge port 2a acts as a discharge port, and the second supply-discharge port 2b acts as a supply port.

In a case where the hydraulic actuator 2 is a single-rod cylinder, a supply oil amount required per unit moving distance of the rod varies from a discharge oil amount required per unit moving distance of the rod. If the discharge oil amount is insufficient relative to the supply oil amount, the hydraulic oil in the sealed tank 17 is supplied to the discharge line via the suction line 24, and is led to the suction port of the pump 12.

Each of the relief valves 16a and 16b sets a hydraulic supply pressure to the hydraulic actuator 2. The hydraulic oil that has flowed from the supply line to the relief passage 15a or 15b due to the function of the relief valve 16a or 16b flows into the tank line 18. Also, the hydraulic oil discharged from the drain port 12c flows into the tank line 18 via the pump drain line 26. The hydraulic oil that has thus flowed into the tank line 18 is purified by the oil filter 22 and cooled by the oil cooler 23, and then flows into the suction line 24, or is stored in the sealed tank 17.

(Structure)

Figure 4:
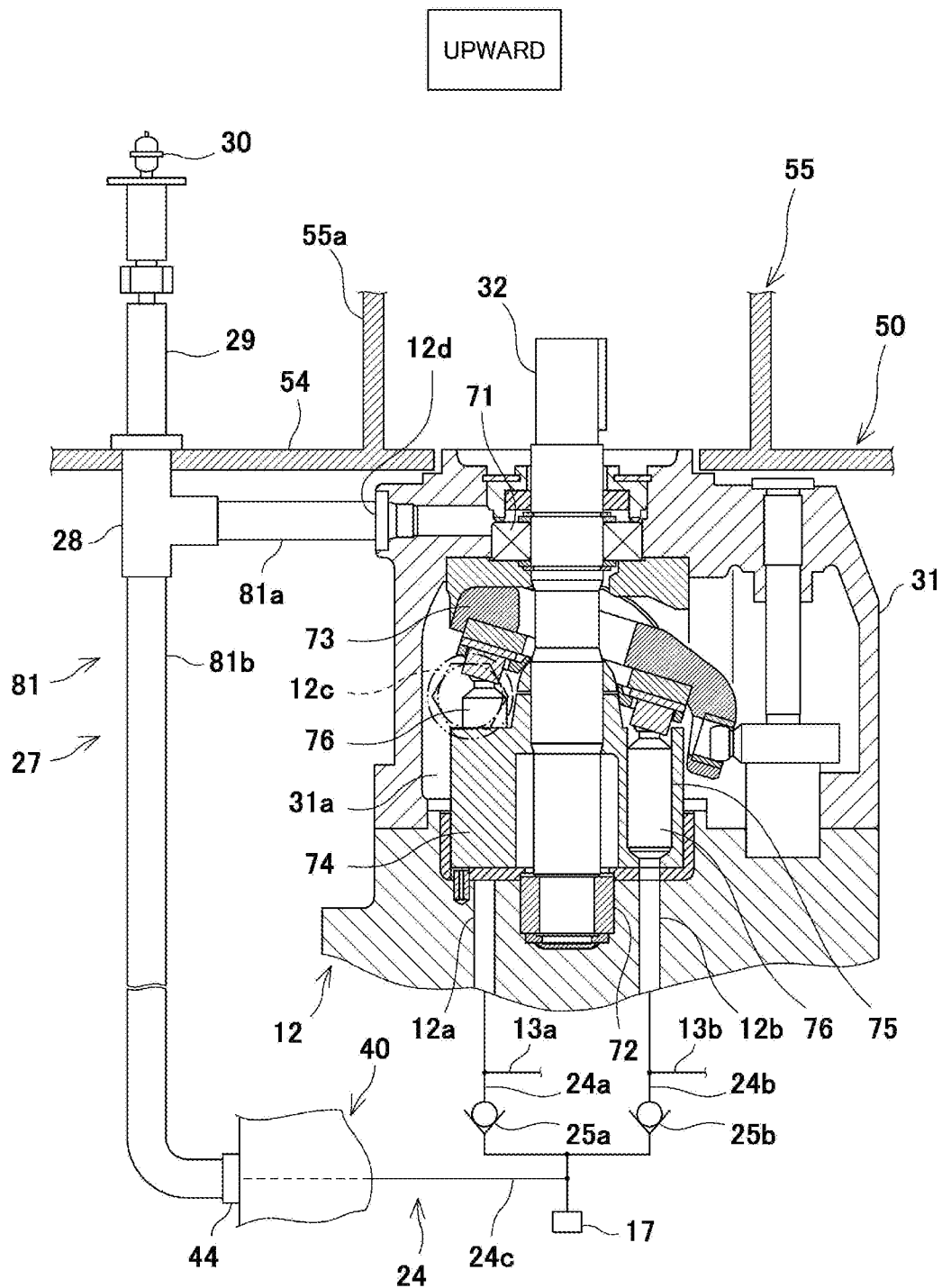
FIG. 4 is a sectional view of a pump according to the embodiment.

As shown in FIG. 1 and FIG. 4, the pump 12 includes a casing 31 and a pump drive shaft 32. The pump drive shaft 32 is rotatably supported by the casing 31. One end of the pump drive shaft 32 protrudes to the outside of the casing 31, and is coupled to an output shaft 34 of the electric motor 11 via a shaft coupling 33 outside the casing 31. The casing 31 is provided with the drain port 12c and the air vent port 12d.

The hydraulic drive unit 1 includes the valve block 40. The valve block 40 is realized by a metal casing. The valve block 40 incorporates therein the following: (a part of) the supply-discharge lines 13a and 13b; a part or the entirety of the oil passages 15a, 15b, 18, 24, and 27, which are connected to the supply-discharge lines 13a and 13b; and at least one of the valves 16a, 16b, 20, 21, 25a, and 25b provided on the supply-discharge lines 13a and 13b and/or the oil passages 15a, 15b, 18, 24, and 27 connected thereto. The oil filter 22 is also accommodated in the valve block 40. The sealed tank 17 and the oil cooler 23 are provided separately from the valve block 40 and the pump 12.

The surface of the valve block 40 is provided with a plurality of ports. The oil supply port 19, which is an end portion of the tank line 18, is formed at the surface of the valve block 40. The surface of the valve block 40 is further provided with a cooler upstream port 41, a cooler downstream port 42, and a tank port 43 in association with the tank line 18. The cooler upstream port 41 is connected to the inlet port of the oil cooler 23, and the cooler downstream port 42 is connected to the outlet port of the oil cooler 23. The ports 41 and 42 may be connected to the ports of the oil cooler 23 by using rubber hoses. Alternatively, the casing surface of the oil cooler 23 may be appressed to the surface of the valve block 40, such that these ports are in communication with each other. The tank port 43 is connected to the oil inlet/outlet 17a of the sealed tank 17 via a piping member. Inside the valve block 40, the oil supply port 19 is connected to the cooler upstream port 41, and the cooler downstream port 42 is connected to the tank port 43.

In this example, the entirety of the suction line 24 and the check valves 25a and 25b are incorporated in the valve block 40. The surface of the valve block 40 is provided with a connecting-line connection port 44. The connecting-line connection port 44 is branched off from the suction line 24 incorporated in the valve block 40. The connecting-line connection port 44 is open at the surface of the valve block 40, and constitutes an end portion of the connecting line 27. A piping member 81 connects between the connecting-line connection port 44 and the air vent port 12d, which is open in the casing 31 of the pump 12. In this manner, the connecting line 27 connecting the air vent port 12d to the suction line 24 is realized. The gas-liquid separator 28 is interposed in the piping member 81.

The surface of the valve block 40 is provided with a first-pump-side supply-discharge port 45a and the actuator-side supply-discharge port 46a in association with the first supply-discharge line 13a, and is provided with a second-pump-side supply-discharge port 45b and the actuator-side supply-discharge port 46b in association with the second supply-discharge line 13b. The actuator-side supply-discharge ports 46a and 46b are connected to the supply-discharge ports 2a and 2b of the hydraulic actuator 2, respectively, via the supply-discharge piping members 3a and 3b. The surface of the casing 31 is placed over the surface in which the first-pump-side supply-discharge port 45a and the second-pump-side supply-discharge port 45b are open. As a result, the first pump port 12a communicates with the first-pump-side supply-discharge port 45a, and the second pump port 12b communicates with the second-pump-side supply-discharge port 45b. The casing 31 is placed on top of the valve block 40 (see FIG. 2). The ports 45a and 45b are formed at the upper surface of the valve block 40, and the casing 31 is placed on the upper surface of the valve block 40 from above.

(Arrangement)

Figure 2:
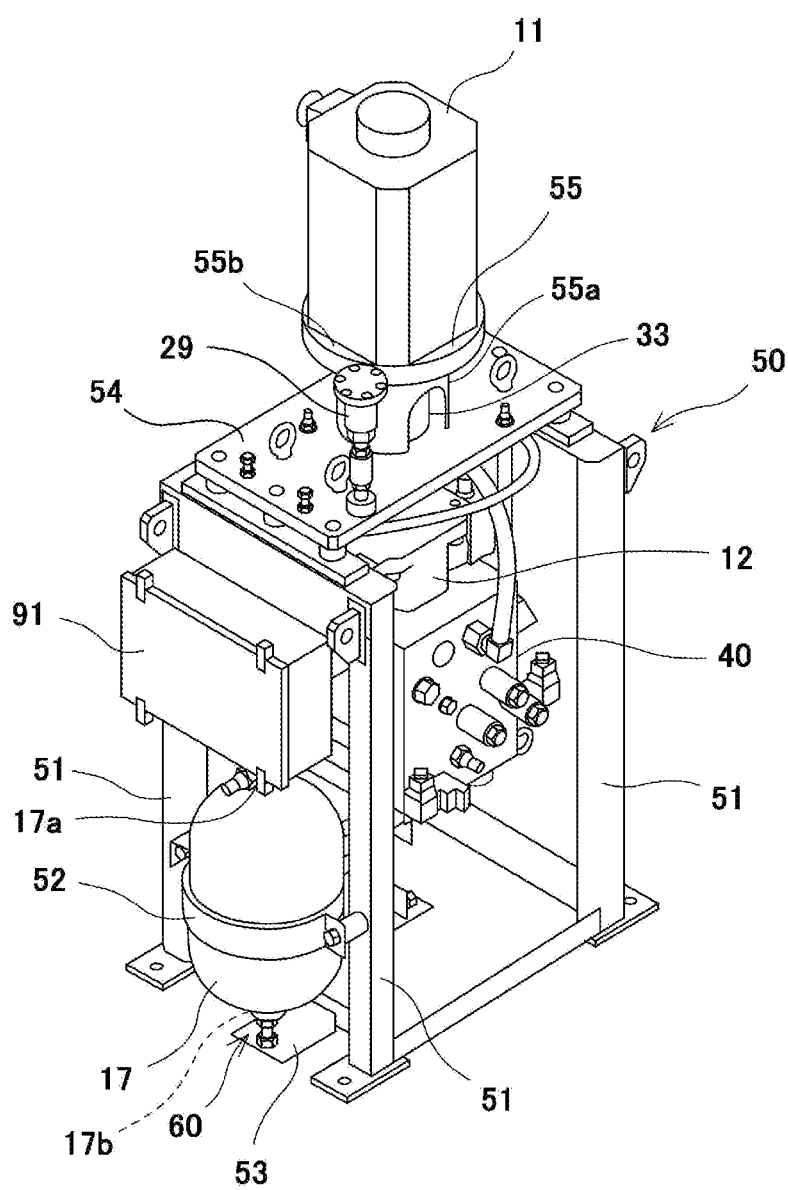
FIG. 2 is a perspective view of a hydraulic drive unit according to the embodiment.

FIG. 2 is a perspective view of the hydraulic drive unit 1. As shown in FIG. 2, the hydraulic drive unit 1 is a vertical unit. The hydraulic drive unit 1 includes a frame 50. The pump 12 and the valve block 40 are mounted to the frame 50. The framework of the frame 50 is constituted by a plurality of (e.g., four) pillar members 51 extending in the upward and downward direction. The valve block 40 and the pump 12 are disposed in the space inside the pillar members 51. The pump 12 is placed on top of the valve block 40, and the oil cooler 23 (not shown in FIG. 2) is mounted under the valve block 40.

The sealed tank 17 is disposed outside the frame 50. To be more specific, the sealed tank 17 is disposed in the space outside the plurality of pillar members 51, or disposed outside the framework of the frame 50. The overall shape of the sealed tank 17 is cylindrical, and both end portions of the sealed tank 17 are formed as hemispherical projecting portions. A holder 52 is wound around the outer circumferential surface of the central portion of the sealed tank 17 in its axial direction, and the holder 52 is fixed to the pillar members 51 by screws. In this manner, the sealed tank 17 is mounted to the frame 50.

The frame 50 includes a bracket 53, which protrudes to the outside of the pillar members 51. The bracket 53 is provided with a tank support mechanism 60. The tank support mechanism 60 supports the bottom portion of the sealed tank 17 from below. The sealed tank 17 is supported by the frame 50 via the tank support mechanism 60, and the oil inlet/outlet 17a of the sealed tank 17 faces upward. Schematically speaking, the sealed tank 17 is disposed lower than the valve block 40. It should be noted that the sealed tank 17 and the valve block 40 are arranged side by side. The oil inlet/outlet 17a is positioned lower than the upper surface of the valve block 40, but higher than the lower surface of the valve block 40. The bottom portion of the sealed tank 17 is positioned lower than the lower surface of the valve block 40.

Figure 3:
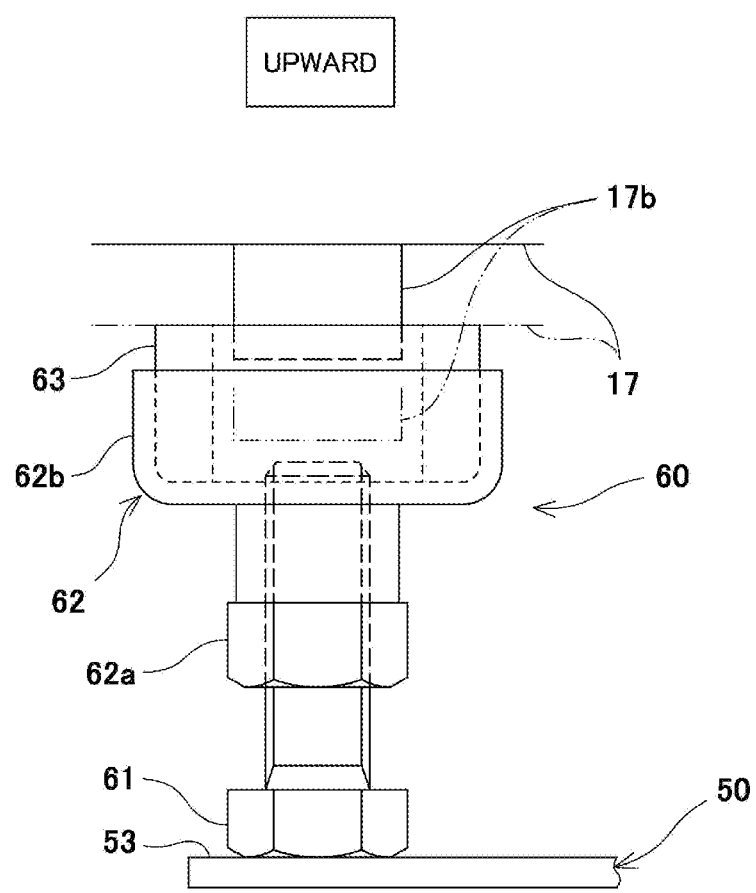
FIG. 3 is a sectional view of a tank support mechanism according to the embodiment.

As shown in FIG. 3, the tank support mechanism 60 includes: a fixing member 61 fixed to the frame 50; and a movable member 62 movable in the upward and downward direction relative to the fixing member 61. The upper end portion of the movable member 62 contacts the bottom portion of the sealed tank 17 from below.

The fixing member 61 is, for example, configured as a bolt. The movable member 62 is, for example, configured as a nut member screwed with the fixing member 61. The fixing member 61 is directed in the upward and downward direction, and one end thereof is placed on the bracket 53. The movable member 62 includes: a nut portion 62a having a female screw thread screwed with the fixing member 61; and a cup portion 62b positioned over the nut portion 62a and integrated with the nut portion 62a. It should be noted that the nut portion 62a and the cup portion 62b may be configured as separate portions from each other. A through-hole in which the fixing member 61 can be inserted is formed in the bottom wall of the cup portion 62b. By rotating the movable member 62 relative to the fixing member 61, the movable member 62 can move straight in the axial direction of the fixing member 61. The cup portion 62b is formed at the upper end of the movable member 62. A tubular member 63 is fitted in the cup portion 62b, and the upper end of the tubular member 63 protrudes upward beyond the upper edge of the cup portion 62b. The tubular member 63 moves together with the movable member 62 in the upward and downward direction relative to the fixing member 61. That is, the upper end portion of the movable member 62 includes the tubular member 63. The tubular member 63 is made of a material that has a lower hardness and a lower mechanical strength than those of the movable member 62 and the sealed tank 17. For example, each of the movable member 62 and the sealed tank 17 is made of a ferrous material such as stainless steel, whereas the tubular member 63 is made of synthetic resin, paper, aluminum, copper, or soft iron.

The sealed tank 17 is a pressure-sealed tank. The bottom portion of the sealed tank 17 is provided with a gas pressure adjusting port 17b, which is used for adjusting the internal gas pressure of the sealed tank 17. The gas pressure adjusting port 17b protrudes cylindrically from the bottom portion of the sealed tank 17. The fixing member 61, the movable member 62, and the tubular member 63 are arranged substantially coaxially with the gas pressure adjusting port 17b. The internal diameter of the tubular member 63 is greater than the external diameter of the gas pressure adjusting port 17b. The shaft length (i.e., the height) of the tubular member 63 is greater than the shaft length (i.e., the amount of protrusion from the bottom portion of the tank) of the gas pressure adjusting port 17b.

Hereinafter, a method of mounting the sealed tank 17 to the frame 50 is described with reference to FIG. 2 and FIG. 3. The tank support mechanism 60 is attached to the frame 50, and the tank support mechanism 60 and the sealed tank 17 are placed on the bracket 53. Since the bracket 53 protrudes to the space outside the pillar members 51 of the frame 50, the work of placing the sealed tank 17 can be readily performed. Moreover, the work of placing the sealed tank 17 can be performed without disassembling the framework of the frame 50.

The holder 52 is wound around the outer circumferential surface of the sealed tank 17, and temporarily fixed to the pillar members 51 so that the sealed tank 17 can slide against the holder 52 in the upward and downward direction. Next, by moving the movable member 62 of the tank support mechanism 60 in the upward and downward direction, the position of the sealed tank 17 in the upward and downward direction relative to the frame 50 is adjusted. Then, the holder 52 is fixed to the pillar members 51, and also, the oil inlet/outlet 17a is connected to the piping member.

In the position adjustment in the upward and downward direction, an end portion of the piping member connected to the tank port 43 of the valve block 40 is brought close to the oil inlet/outlet 17a. In this manner, positional deviation between the oil inlet/outlet 17a and the piping member is absorbed, and thereby the piping member can be connected to the sealed tank 17, the positional deviation being caused by the following factors: assembling errors of the frame 50; mounting errors in mounting the valve block 40 to the frame 50; tolerances of the valve block 40; tolerances of the piping member; and tolerances of the sealed tank 17. This consequently makes it possible to suppress the application of an excessive stress to the piping member.

By thus mounting the sealed tank 17 to the frame 50, the bottom portion of the sealed tank 17 contacts the upper end of the tubular member 63, and the load of the sealed tank 17 is received by the tubular member 63 of the tank support mechanism 60. Since the tubular member 63 is made of a material having a lower hardness and a lower mechanical strength than those of the sealed tank 17, damage to the bottom portion of the sealed tank 17 can be prevented. The tubular member 63 surrounds the gas pressure adjusting port 17b without interfering with the gas pressure adjusting port 17b. The amount of protrusion of the gas pressure adjusting port 17b is less than the height of the tubular member 63, and an end portion of the gas pressure adjusting port 17b does not interfere with the cup portion 62b. Thus, by applying the tubular member 63, damage to the bottom portion of the sealed tank 17, in particularly, damage to the gas pressure adjusting port 17b, can be suppressed.

By following the above-described steps in the reverse order, the sealed tank 17 can be detached from the frame 50. Also when detaching the sealed tank 17 from the frame 50, it is unnecessary to disassemble the framework of the frame 50. When performing maintenance work on the sealed tank 17, detaching and re-mounting of the sealed tank 17 may be necessary in some cases. In such a case, since the sealed tank 17 is disposed outside the framework of the frame 50 such that the sealed tank 17 is mountable to and detachable from the frame 50 without disassembling the framework of the frame 50, the work of mounting and detaching the sealed tank 17 can be readily performed, and consequently, maintenance work on the sealed tank 17 can be readily performed.

As shown in FIG. 2, the frame 50 includes a top plate 54, which is provided on the upper end of the pillar members 51. A motor stay 55 is provided on the top plate 54, such that the motor stay 55 protrudes upward from the central portion of the top plate 54. The motor stay 55 includes: a cylindrical portion 55a protruding upward from the top plate 54; and a horizontal plate portion 55b provided on the upper end of the cylindrical portion 55a. The electric motor 11 in such an orientation that the axis thereof extends in the upward and downward direction is set on the horizontal plate portion 55b. The output shaft 34 of the electric motor 11 penetrates the horizontal plate portion 55b into the cylindrical portion 55a, and inside the cylindrical portion 55a, the output shaft 34 is coupled to the pump drive shaft 32 via the shaft coupling 33. The pump drive shaft 32 protrudes from the casing 31, and penetrates the top plate 54 into the cylindrical portion 55a. Among the hydraulic equipment constituting the hydraulic drive unit 1 (excluding the electric motor 11, the shaft coupling 33, the air passage 29, and the air vent valve 30), the pump 12 is disposed at the highest position.

As shown in FIG. 4, a sealed space 31a is formed inside the casing 31. The pump drive shaft 32 is inserted in the sealed space 31a, and is rotatably supported by an upper bearing 71 and a lower bearing 72, which are accommodated in the sealed space 31a. The upper bearing 71 is disposed upward of the lower bearing 72, and is accommodated in the upper part of the sealed space 31a. Inside the sealed space 31a, a swash plate 73 and a cylinder block 74 are disposed between the upper and lower bearings 71 and 72. A plurality of cylinder bores 75 are formed in the cylinder block 74, and pistons 76 are inserted in the respective cylinder bores 75.

As one example, the pump 12 is of a fixed swash plate type. When the pump drive shaft 32 rotates, the cylinder block 74 rotates together with the pump drive shaft 32. Each piston 76 moves in a reciprocating manner in one of the cylinder bores 75 by a stroke corresponding to the inclination angle of the swash plate 73. When the piston 76 protrudes upward from the cylinder bore 75, the hydraulic oil is sucked into the cylinder bore 75 via one of the pump ports 12a and 12b. When the piston 76 is pushed into the cylinder bore 75, the hydraulic oil is delivered from the cylinder bore 75 to the other one of the pump ports 12a and 12b.

Inside the casing 31, a large number of components require lubrication. Here, the hydraulic oil acts as a lubricant for lubricating these components. The hydraulic oil that leaks from either one of the pump port 12a or 12b of a higher pressure flows into the casing 31, and the sealed space 31a is filled with the hydraulic oil. In the upper part of the sealed space 31a, in particular, from the space where the upper bearing 71, which is disposed at the highest position among all the lubrication-requiring components, is accommodated, the air vent port 12d extends in a radial direction through the wall of the casing 31, and is open at the outer surface of the casing 31.

It is possible that air enters the sealed space 31a together with the hydraulic oil. The air entering the sealed space 31a together with the hydraulic oil is accumulated in the upper part of the sealed space 31a. When the air is thus accumulated, it may cause insufficiency in the amount of lubricant for the upper bearing 71. Meanwhile, the air vent port 12d is positioned in the upper part of the sealed space 31a, and is in communication with the space where the upper bearing 71 is accommodated. For this reason, the air accumulated in the sealed space 31a can be readily discharged to the outside of the casing 31, and also, lubricant insufficiency for the lubrication-requiring components in the casing 31 can be avoided.

The gas-liquid separator 28 and the pump 12 are disposed side by side, and the gas-liquid separator 28 is mounted to the lower surface of the top plate 54. The air passage 29 protrudes upward from the top plate 54. The air vent valve 30 is provided at the upper end of the air passage 29, such that the air vent valve 30 and the motor stay 55 are disposed side by side. The piping member 81, which connects the air vent port 12d to the connecting-line connection port 44, includes a first piping member 81a and a second piping member 81b. The first piping member 81a connects the air vent port 12d to the gas-liquid separator 28, and the second piping member 81b connects the gas-liquid separator 28 to the connecting-line connection port 44. The first piping member 81a extends substantially horizontally, and is capable of suppressing the accumulation, in the first piping member 81a, of air that is discharged from the air vent port 12d.

It should be noted that, as shown in the drawing, the drain port 12c has a greater diameter than that of the air vent port 12d. However, the hydraulic oil flowing from the drain port 12c is subjected to passing resistance when passing through the oil cooler 23. Consequently, a flow of the hydraulic oil through the connecting line 27 is obtained. Accordingly, the hydraulic oil smoothly flows to the air vent port 12d, and air can be removed from the casing 31 together with the hydraulic oil.

As described above, the hydraulic drive unit 1 according to the present embodiment is of a closed circuit type. The hydraulic drive unit 1 includes: the sealed tank 17, in which the hydraulic oil is stored; the pump 12; the valve block 40; the suction line 24, through which the hydraulic oil in the sealed tank 17 is supplied to one of the pair of pump ports 12a and 12b, the one port acting as a suction port; the connecting line 27, which connects the air vent port 12d of the pump 12 to the suction line 24; and the gas-liquid separator 28, which separates the air and the hydraulic oil flowing through the connecting line from each other. The valve block 40 incorporates therein the following: a part of the pair of supply-discharge lines 13a and 13b, which connects the pair of pump ports 12a and 12b to the pair of supply-discharge ports 2a and 2b of the hydraulic actuator 2; and at least one of the valves 16a, 16b, 20, 21, 25a, and 25b provided on the pair of supply-discharge lines 13a and 13b and/or the oil passages 15a, 15b, 18, and 24 connected thereto. The pump 12 is placed on top of the valve block 40, and is disposed upward of the sealed tank 17.

Therefore, even if air enters the sealed tank 17, the air can be collected, via the suction line 24 and the valve block 40, in the casing 31 of the pump 12, which is disposed upward of the sealed tank 17 and the valve block 40. The air collected in the casing 31 passes through the air vent port 12d together with the hydraulic oil, and is led toward the suction line 24. The air is separated from the hydraulic oil by the gas-liquid separator 28, and is released to the outside. A flow directed to the suction side of the pump ports 12a and 12b tends to occur in the suction line 24. Accordingly, a flow from the air vent port 12d to the suction line 24 also tends to occur, which facilitates discharging of the air from the casing 31. For these reasons, the air can be readily removed from the inside of the unit 1.

In addition, the sealed tank 17 is mounted to the frame 50, such that the oil inlet/outlet 17a faces upward. Therefore, even if air is present in the sealed tank 17, the air gathers near the oil inlet/outlet 17a in the upper part of the sealed tank 17. Accordingly, the air is readily led to the pump 12 together with the hydraulic oil via the oil inlet/outlet 17a and the suction line 24. This makes it possible to suppress the accumulation of air in the sealed tank 17.

Although the embodiment of the present invention has been described as above, suitable modifications, additions, and/or deletions can be made to the above-described configurations within the scope of the present invention.

REFERENCE SIGNS LIST 1 hydraulic drive unit
2 hydraulic actuator
2a, 2b supply-discharge port
11 electric motor
12 pump
12a, 12b pump port
12c drain port
12d air vent port
13a, 13b supply-discharge line
17 sealed tank
17a oil inlet/outlet
17b gas pressure adjusting port
24 suction line
27 connecting line
28 gas-liquid separator
31 casing
40 valve block
50 frame
60 tank support mechanism
61 fixing member
62 movable member
63 tubular member

The invention claimed is:

1. A hydraulic drive unit for driving a hydraulic actuator including a pair of supply-discharge ports, the hydraulic drive unit comprising:
a pump including a casing, a pair of pump ports, and an air vent port from which air in the casing is discharged to an outside of the casing together with hydraulic oil;
a pair of supply-discharge lines that connects between the pair of pump ports and the pair of supply-discharge ports;
a valve block that incorporates at least one valve therein, the at least one valve being provided on the pair of supply-discharge lines and/or oil passages connected to the pair of supply-discharge lines;
a sealed tank that is connected to the pair of supply-discharge lines, the sealed tank storing the hydraulic oil;

a suction line that leads the hydraulic oil in the sealed tank to the pump;

a connecting line that connects the air vent port to the suction line;

a gas-liquid separator that separates the air and the hydraulic oil flowing through the connecting line from each other, the gas-liquid separator supplying the separated hydraulic oil to the suction line while releasing the separated air from the connecting line, a frame to which the pump and the valve block are mounted; and a tank support mechanism that supports a bottom portion of the sealed tank from below; wherein the pump is disposed upward of the valve block and the sealed tank in a vertical direction;

the sealed tank is disposed such that a hydraulic oil inlet/outlet of the sealed tank faces upward, and such that the sealed tank is mountable to and detachable from the frame without disassembling a framework of the frame;

the tank support mechanism includes:
   a fixing member fixed to the frame, and
   a movable member that is movable in an upward and downward direction relative to the fixing member; and an upper end portion of the movable member contacts the bottom portion of the sealed tank from below.

2. The hydraulic drive unit according to claim 1, wherein the sealed tank is a pressure-sealed tank, the bottom portion of the sealed tank is provided with a gas pressure adjusting port for adjusting an internal gas pressure of the sealed tank, the upper end portion of the movable member includes a tubular member that surrounds the gas pressure adjusting port, the tubular member contacting the bottom portion of the sealed tank, and the tubular member is made of a material having a lower hardness than that of the sealed tank.

\* \* \* \* \*